United States Patent
Akimoto

(10) Patent No.: US 7,865,686 B2
(45) Date of Patent: Jan. 4, 2011

(54) VIRTUAL COMPUTER SYSTEM, AND PHYSICAL RESOURCE RECONFIGURATION METHOD AND PROGRAM THEREOF

(75) Inventor: Shunsuke Akimoto, Tokyo (JP)

(73) Assignee: NEC Corporation, Tokyo (JP)

( * ) Notice: Subject to any disclaimer, the term of this patent is extended or adjusted under 35 U.S.C. 154(b) by 400 days.

(21) Appl. No.: 11/723,601

(22) Filed: Mar. 21, 2007

(65) Prior Publication Data

US 2007/0226449 A1 Sep. 27, 2007

(30) Foreign Application Priority Data

Mar. 22, 2006 (JP) ............................. 2006-077930

(51) Int. Cl.
*G06F 12/00* (2006.01)
(52) U.S. Cl. ..................... 711/170; 718/104; 718/105
(58) Field of Classification Search ............. 711/170; 718/104, 105
See application file for complete search history.

(56) References Cited

U.S. PATENT DOCUMENTS

| | | | | |
|---|---|---|---|---|
| 5,452,455 | A * | 9/1995 | Brown et al. ................ | 713/100 |
| 6,877,158 | B1 * | 4/2005 | Arndt ........................... | 718/104 |
| 7,461,231 | B2 * | 12/2008 | Branda et al. ................ | 711/173 |
| 2005/0071843 | A1 * | 3/2005 | Guo et al. ..................... | 718/101 |
| 2006/0251109 | A1 * | 11/2006 | Muller et al. ................ | 370/463 |

FOREIGN PATENT DOCUMENTS

| | | |
|---|---|---|
| JP | 2002-202959 | 7/2002 |
| JP | 2003-157177 | 5/2003 |
| JP | 2004-530196 | 9/2004 |
| JP | 2006-127462 | 5/2006 |

OTHER PUBLICATIONS

Japanese Official Action - 2006-077930 - Nov. 2, 2010.

* cited by examiner

*Primary Examiner*—Reginald G Bragdon
*Assistant Examiner*—Hamdy S Ahmed
(74) *Attorney, Agent, or Firm*—Young & Thompson

(57) ABSTRACT

Provided is a virtual computer system capable of finding a configuration whose total sum of memory access delays is smaller than that of a current configuration. In a virtual computer system in which with memory access times within a node and between nodes differing from each other, a hypervisor controls a plurality of virtual processors which execute a process on a plurality of nodes, the hypervisor includes a unit which obtains a total sum of memory access delay time on the virtual machine based on affinity information indicative of a latency or a band of communication between the virtual processors and traffic between the virtual processors, and a unit which reconfigures physical resources based on the total sum of delay time.

11 Claims, 8 Drawing Sheets

LATENCY TABLE

|    | N1  | N2  | N3  | N4  |
|----|-----|-----|-----|-----|
| N1 | 10  | 100 | 100 | 100 |
| N2 | 100 | 10  | 100 | 100 |
| N3 | 100 | 100 | 10  | 100 |
| N4 | 100 | 100 | 100 | 10  |

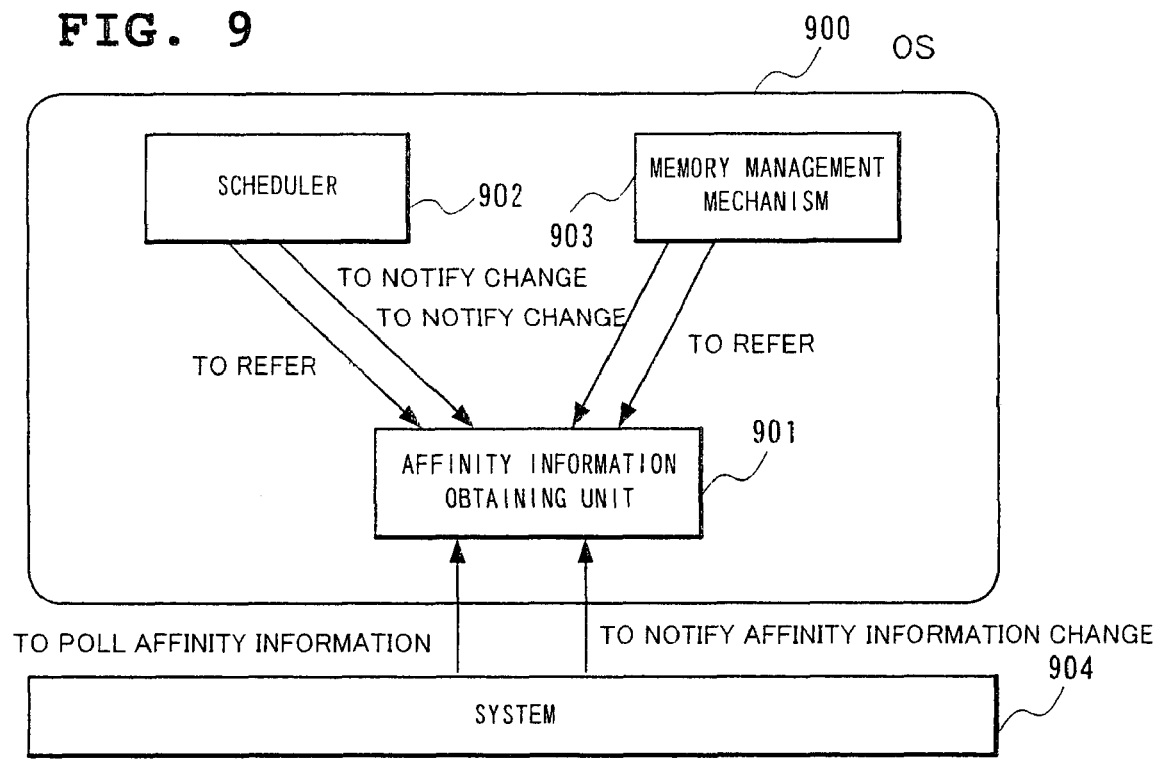

VIRTUAL COMPUTER SYSTEM, AND PHYSICAL RESOURCE RECONFIGURATION METHOD AND PROGRAM THEREOF

BACKGROUND OF THE INVENTION

1. Field of the Invention

The present invention relates to a virtual computer system, and a physical resource reconfiguration method and a program thereof and, more particularly, to a virtual computer system in which with memory access times within a node and between nodes differing from each other, a hypervisor controls a virtual processor which executes a process on a plurality of nodes, and a physical resource reconfiguration method thereof.

2. Description of the Related Art

NUMA (Non Uniform Memory Access) type multiprocessor system (see Literature 1) is a kind of shared memory type multiprocessor system characterized in having a latency or a bandwidth between a processor and a memory varying with a region of a memory to be accessed. Among common NUMA architecture mounting forms are, for example, those in which between a plurality of groups (hereinafter referred to as node) having an UMA (Uniform Memory Access) configuration are all connected (see FIG. 2) and in which nodes are point-to-point connected.

In any form, an access to a local memory (a memory of a node to which a processor belongs) and an access to a remote memory (a memory of other node) differ in rate (this difference in access rate will be represented hereinafter as "distance between nodes" or "affinity between nodes").

Because of this characteristic, in order to obtain excellent performance in a system with the NUMA architecture, it is effective to localize a memory access as much as possible. Realized in an OS for this purpose are a memory management method of assigning a memory region so as to bridge over nodes to the least by using a table called an SLIT (System Locality Information Table) or an SRAT (Static Resource Affinity Table) in which affinity between physical resources (CPU/memory/IO) is stored (hereinafter referred to as affinity table) and such a mechanism as a scheduler by which a processor on which a process or a thread operates is shifted to the least.

This mechanism is applicable only to static operation of reading affinity information at the start of an OS and using the same and there yet to exist no technique of coping with a dynamic change of a system by dynamically updating an affinity table.

On the other hand, there exists a virtual computer system having a mechanism of dynamically changing a resource assignment rate in order to effectively use resources by using a Hotplug function of a guest OS according to variation of a load of a virtual machine without stopping the system. In this technical field, however, no technique is yet to exist for obtaining such a configuration as makes the most of performance by optimizing resource arrangement while taking affinity information peculiar to the NUMA architecture into consideration.

Other related art are Literature 2 and Literature 3:
Literature 1: Japanese Translation of PCT International Application No. 2004-530196
Literature 2: Japanese Patent Laying-Open No. 2002-202959
Literature 3: Japanese Patent Laying-Open No. 2003-157177

In a conventional virtual computer system, no affinity is taken into consideration when assigning physical resources to virtual resources. As a result, resources might be assigned in such a manner as fails to make the most of performance of a NUMA system. In a case where resources are assigned in such a manner as causes a frequent memory access to a remote node, possible mechanism is reconfiguring a system to review resource assignment to manage with a local node access.

It is, however, impossible with conventional art to precisely determine which virtual machine should be reconfigured for more efficiency because there is no method of quantitatively measuring performance of memory access or quantity as its index (hereinafter represented as performance of memory access) in a virtual machine.

Even when a virtual machine to be reconfigured is decided, it is difficult to determine efficient configuration to be assigned to the machine. The reason is that when a configuration of physical resources to be assigned to the virtual machine is changed, there is no method of predicting to which extent performance of a memory access is improved.

Moreover, because a conventional OS fails to have a mechanism of coping with a dynamic change of an affinity table, even when a hypervisor dynamically changes a configuration of a virtual machine, the OS is not allowed to efficiently use its resources unless the OS is restarted.

SUMMARY OF THE INVENTION

An object of the present invention is to provide a virtual computer system capable of determining which virtual machine is to be preferentially reconfigured, and a physical resource reconfiguration method and a program thereof.

Another object of the present invention is to provide a virtual computer system capable of finding a configuration having a smaller total sum of memory access delays as compared with a current configuration, and a physical resource reconfiguration method and a program thereof.

A further object of the present invention is to provide a virtual computer system enabling an OS to efficiently use resources without stopping operation of the OS when physical resources are dynamically reconfigured, and a physical resource reconfiguration method and a program thereof.

According to the first aspect of the invention, a virtual computer system in which with memory access times within a node and between nodes differing from each other, a hypervisor controls a virtual processor which executes a process on a plurality of nodes, wherein the hypervisor includes a unit which obtains a total sum of memory access delay time on the virtual machine based on affinity information indicative of a latency or a band of communication between the virtual processors and traffic between the virtual processors, and a unit which reconfigures a physical resource based on the total sum of delay time.

According to the second aspect of the invention, a resource reconfiguration method in a virtual computer system in which with memory access times within a node and between nodes differing from each other, a hypervisor controls a virtual processor which executes a process on a plurality of nodes, comprises the steps of obtaining a total sum of memory access delay time on the virtual machine based on affinity information indicative of a latency or a band of communication between the virtual processors and traffic between the virtual processors, and reconfiguring a physical resource based on the total sum of delay time.

According to another aspect of the invention, a program for causing a computer to execute a resource reconfiguration method in a virtual computer system in which with memory access times within a node and between nodes differing from each other, a hypervisor controls a virtual processor which executes a process on a plurality of nodes, comprises the functions of a function of obtaining a total sum of memory access delay time on the virtual machine based on affinity information indicative of a latency or a band of communication between the virtual processors and traffic between the virtual processors, and a function of reconfiguring a physical resource based on the total sum of delay time.

According to the present invention, the following effects can be obtained. First effect is that a total sum of memory access delays in a current configuration can be estimated by estimating the amount of transaction in a virtual machine, thereby discriminating which virtual machine has the largest delay caused by memory access. As a result, it is possible to determine which virtual machine is to be preferentially reconfigured.

Second effect is that a current configuration and other configuration can be quantitatively compared because a total sum of memory access delays can be estimated with respect to arbitrary physical resource assignment to a current virtual machine configuration. This enables a configuration with a smaller total sum of memory access delays to be found as compared with a current configuration. It is also possible to find an optimum configuration having the smallest total sum of memory access delays.

Third effect is that enabling an OS on a virtual machine to dynamically update virtual affinity information leads to efficient use of resources by the OS when dynamic reconfiguration is executed without stopping operation of the OS.

With the foregoing effects, partially optimizing a certain virtual machine with high priority enables control to cause the virtual machine to exhibit highest performance all the time and periodically optimizing the entire system enables control to cope with variation of loads in time and space.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 9 is a diagram of a configuration for changing affinity information without stopping operation of the OS.

DESCRIPTION OF THE PREFERRED EMBODIMENT

Figure 1:
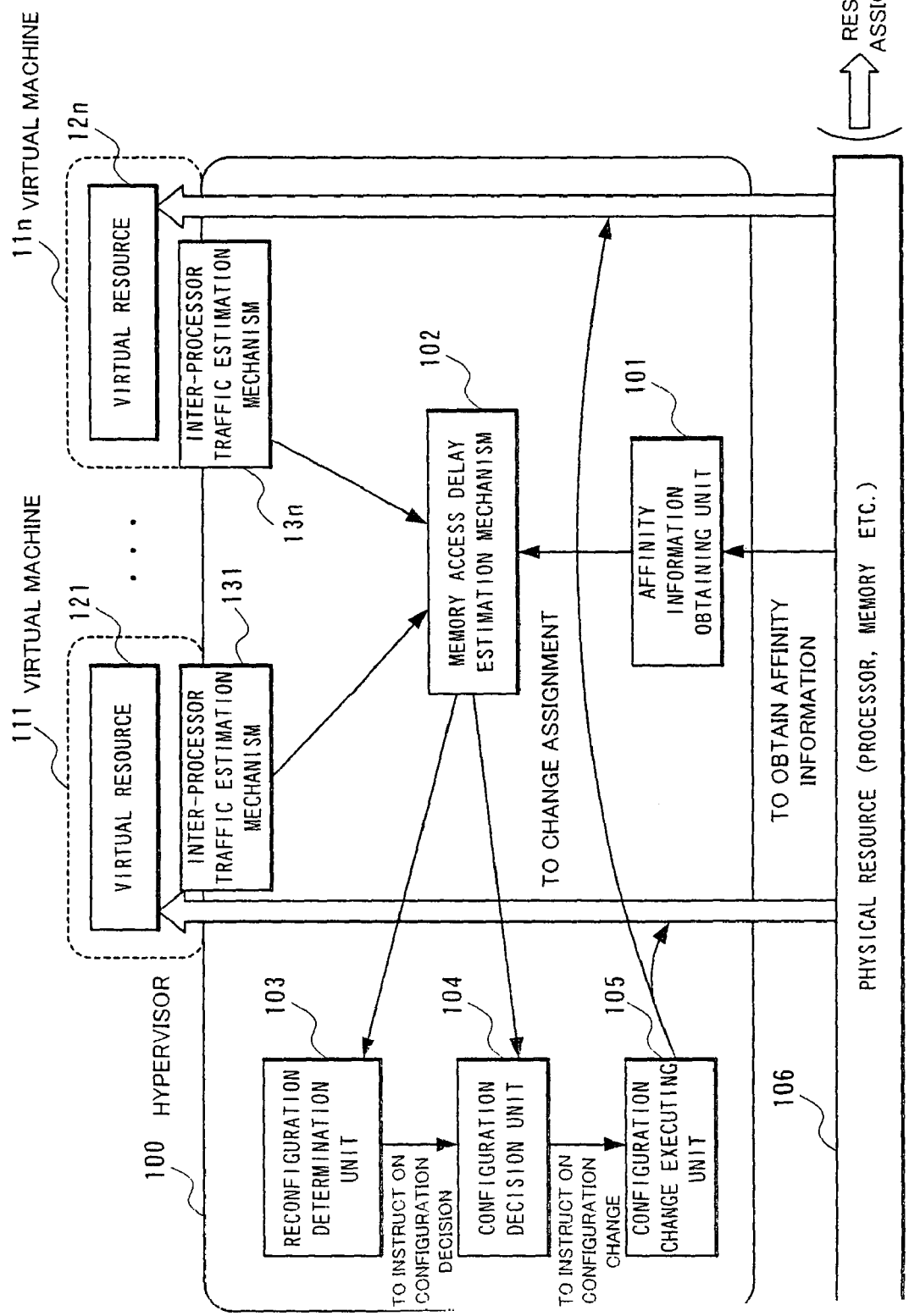
FIG. 1 is a diagram showing a system configuration of an embodiment of the present invention.

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

In a virtual computer system according to the present invention, a total sum of memory access delays is used as an index value of memory access performance. For obtaining a total sum of memory access delays on the virtual machine, units set forth in the following are provided.

(1) Unit which obtains affinity information of inter-processor communication. Affinity information here is mainly intended as a latency of memory access between nodes, which possibly includes information about a band between nodes.

(2) Unit which estimates the amount of memory transaction between two arbitrary virtual processors in an arbitrary virtual machine. The amount of memory transaction here represents an index which enables, together with affinity information, a total sum of memory access delays to be derived. For example, when a latency of a memory access between nodes (affinity information) and the number of accesses to a memory (the amount of memory transaction) are found, their product will be a total sum of memory access delay time caused by a latency. In addition, with a band between nodes (affinity information) and the amount of access to a memory (the amount of memory transaction), a total sum of memory access delay time with a bandwidth as an index is found.

(3) Unit which estimates, related to an arbitrary virtual machine, a total sum of memory access delays based on affinity information and an estimation value of the amount of transaction between two arbitrary virtual processors in the virtual machine, with assignment of physical resources to virtual resources of the virtual machine arbitrarily changed. When a current resource assignment is used here as "arbitrarily changed configuration", a total sum of memory access delays in the current configuration of the virtual machine can be estimated.

In addition, the virtual computer system of the present invention is further provided with units set forth below in order to dynamically optimize a configuration by using a total sum of memory access delays obtained above.

(4) Unit which determines whether physical resources are to be reconfigured or not. Applicable bases here for determining whether to execute reconfiguration are (a) reconfiguration is executed when a user directly issues a reconfiguration instruction, (b) reconfiguration is periodically executed without fail, (c) with an allowable threshold of a total sum of memory access delays provided at a virtual machine, reconfiguration is executed when a total sum of memory access delays of the virtual machine exceeds the threshold value and (d) reconfiguration is executed when a total sum of memory access delays of all the virtual machines in the current configuration exceeds a defined value. User is allowed to set in advance, as a policy, with which basis, determination whether to execute reconfiguration is made. In a case where determination whether to execute reconfiguration is made based on measurement of a total sum of memory access delays such as (c) and (d), when reconfiguration determination is made based on a result of a single measurement, reconfiguration will be executed frequently, so that performance is expected to be degraded. Therefore, possible is a unit which makes reconfiguration determination based on information integrating a plurality of measurements executed at sufficient intervals.

(5) Unit which decides on a new configuration. Possible new configurations include (a) optimum assignment described in (4), (b) such an assignment as suppresses a performance loss under a threshold value only with respect to a virtual machine whose total sum of memory access delays exceeds the threshold value and (c) preferential assignment of a processor or a memory with a short distance to a virtual machine having high priority. Also as to these decision policies, a user is allowed to set them in advance.

(6) Unit which executes re-allocation of resources based on a decided configuration.

(7) Unit on an OS which is designed to dynamically update affinity information without restarting the OS or a unit which once stops a task on the OS to end the OS and changes affinity information to start the OS, thereby operating the task again. These are units which can be realized within a range of conventional techniques.

In the following, an embodiment of the present invention will be described in detail with reference to the drawings. FIG. 1 is a functional block diagram of an embodiment of the present invention. With reference to FIG. 1, a hypervisor 100 according to the present invention includes an affinity information obtaining unit 101 for obtaining affinity information from a system of a physical resource 106 such as a processor or a memory, inter-processor traffic estimation mechanisms 131, ... 13$n$ for estimating traffic between arbitrary virtual processors in respective virtual machines 111, ..., 11$n$, a memory access delay estimation mechanism 102 for estimating a total sum of memory access delays with respect to an arbitrary physical resource assignment in each virtual machine based on an estimated amount of inter-processor communication in the respective virtual machines 111, ..., 11$n$ and affinity information, a reconfiguration determination unit 103 for determining whether reconfiguration is to be executed based on an estimation value of a total sum of memory access delays, a configuration decision unit 104 for deciding on assignment of the physical resource 106 to the virtual machine and a configuration change executing unit 105 for actually changing a configuration.

To the respective virtual machines 111, ..., 11$n$, a threshold value for determining whether to execute reconfiguration can be set. 121, ..., 12$n$ represent virtual resources assigned to the respective virtual machines 111, ..., 11$n$.

Figure 2:
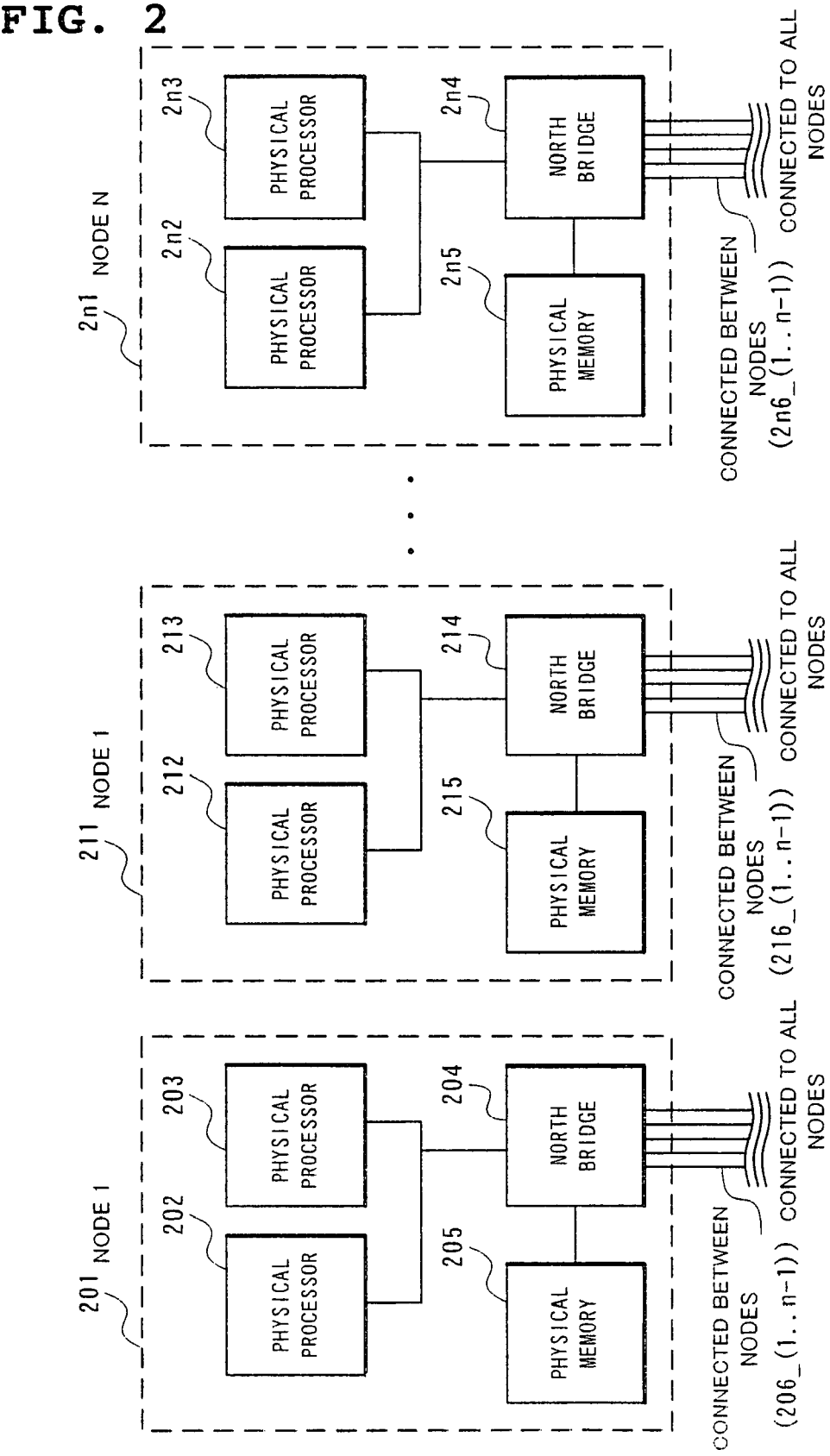
FIG. 2 is a diagram showing an all-connected NUMA system used in the embodiment of the present invention.

System assumed in the present embodiment is such an all-connected NUMA system as shown in FIG. 2 and a band between nodes, a node 1 (201) through a node n (2$n$1), is assumed to have no difference. Each node is assumed to have a physical processor, a physical memory and a north bridge.

Figures 3, 4:
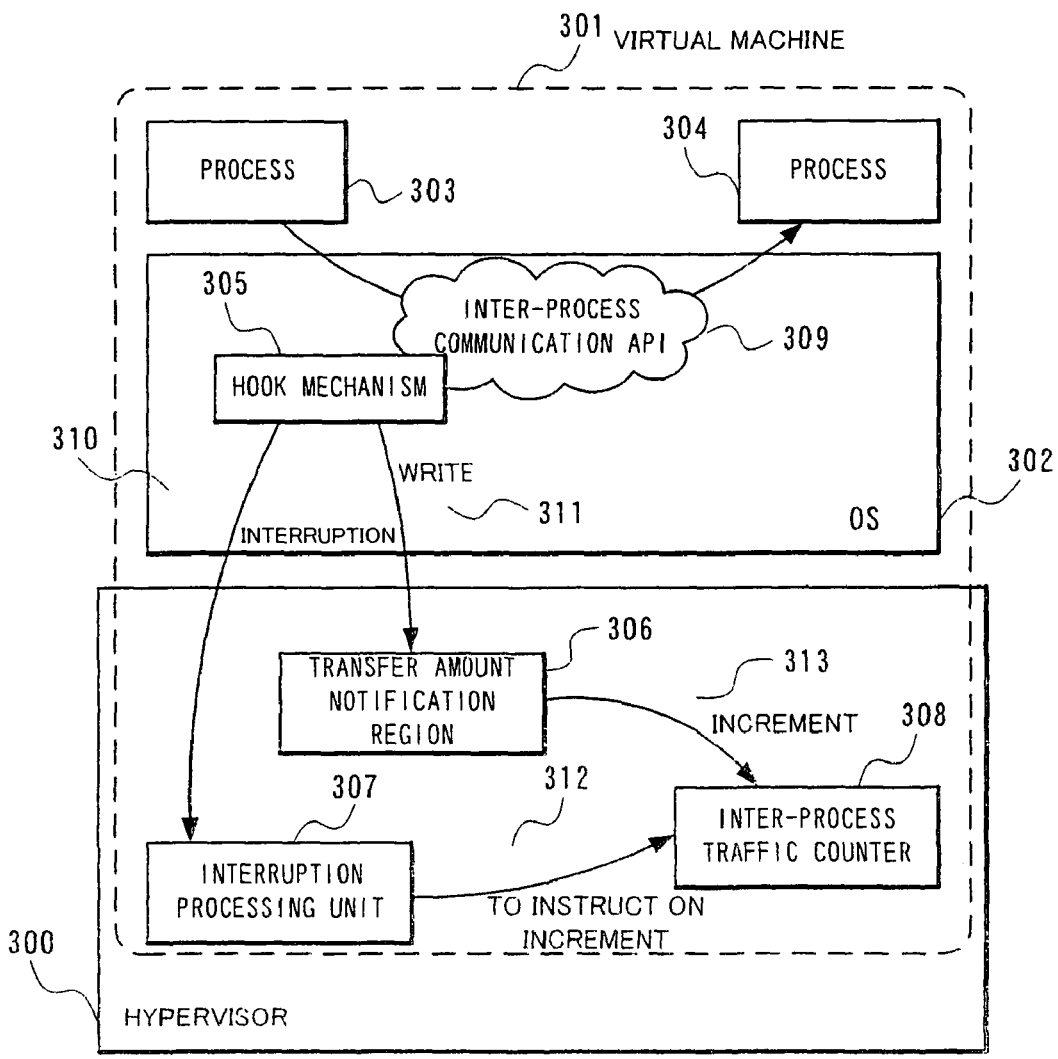
FIG. 3 is a diagram showing an example of a table of affinity information used in the embodiment of the present invention.
FIG. 4 is a block diagram for use in obtaining a total sum of the volume of data transmitted in inter-process communication executed on a virtual machine in the embodiment of the present invention.

Used as affinity information is only a memory access latency. An affinity table in this case is as shown in FIG. 3, for example. The table represents an inter-node latency table of a NUMA system formed of four nodes.

Next, the inter-processor traffic estimation unit will be detailed with reference to FIG. 2. The inter-processor traffic can be estimated from a measurement value of a total sum of the volume of data transmitted in all the inter-process communication executed on a virtual machine and the number of virtual processors. Estimation of the inter-processor traffic in this example is made on the assumption set forth below.

(1) Inter-processor communication within a virtual machine is almost all occupied by inter-process communication.

(2) Processor which will execute a process is selected from among all the processors with an equal probability.

(3) Process is generated on a virtual machine with appropriate frequency. Appropriate frequency here denotes that the number of processes sufficient as a statistic are generated while a volume of data transmitted in inter-process communication is measured. Timing of process generation is at random.

(4) A main process operating in a virtual machine all has an appropriate lifetime. Appropriate lifetime here denotes a time shorter enough than a time period of measurement of a volume of data transmitted in inter-process communication.

(5) With an affinity table reflecting affinity of assigned physical resources given, an OS on each virtual machine, at the time of ensuring a memory for a process, ensures a memory as much as possible from a region which will be a local memory for a processor to which the process is assigned.

First, by the assumption indicated in (2), (3) and (4), a sufficient number of processes are generated while inter-process communication is measured and after being assigned to all the virtual processors with an equal probability and executed, they are completed. As a result, frequency of inter-process communication executed in every pair of two processors will be substantially of the same degree. Therefore, the volume of data communicated between one pair of processors (including communication to the relevant processor itself) can be obtained by dividing all the inter-process traffic on the virtual machine by the number of combinations of two arbitrary processors (n $C_2$+n).

In addition, by multiplying a volume of data communicated between one-paired processors by the number of combinations between two arbitrary processors excluding a combination of the relevant processors themselves (n $C_2$), a total sum of the traffic between different virtual processors can be obtained.

Next, by the assumption of (5), it is ensured that in communication between virtual processors, transmitted data is written by a remote access to a memory assigned to a virtual processor of a transmission destination without fail. As a result, the volume of data transmitted between virtual processors and the volume of data transmitted in a remote access coincide with each other.

Lastly, by the assumption of (1), a total volume of data transmitted to a remote memory by inter-process communication substantially coincides with a total volume of data transmitted to the remote memory by inter-processor communication. From the foregoing, the volume of data transmitted between virtual processors on a virtual machine can be estimated when a total sum of the volume of transmitted data in all the inter-process communication executed on the virtual machine and the number of virtual processors are obtained.

It is also possible to estimate the number of memory transactions in a physical resource from the volume of data transmitted between two arbitrary processors. In a common computer system, memory access is executed on a basis of some lumped amount as a unit for making an efficient memory access. When a unit of the traffic is found, dividing data traffic by the unit leads to estimation of the number of memory transactions. Since the unit of a lump for memory access depends on architecture, the hypervisor in this example is assumed to know the value in advance or obtain the value from hardware.

It is further possible to obtain a total sum of memory access delays within the virtual machine based on the number of memory transactions between two arbitrary virtual processors, information about correspondence of a physical resource to a virtual resource and information about a latency between nodes. With the numbers of certain one pair of processors as i,j, the number of memory transactions between the processor i and the processor j as $k_{ij}$ and a memory access latency between the processor i and the processor j as $d_{ij}$, a memory access delay between the processor i and the processor j is obtained by its product $k_{ij} \cdot d_{ij}$.

Accordingly, a total sum of memory access delays by a combination of all the processors in the virtual machine can be obtained by $SUM\{i,j\}$ $(k_{ji} \cdot d_{ij})$. $SUM\{i,j\}( )$ is assumed to be a function of a total sum of all the combinations $\{i,j\}$.

Next, description will be made of a transmission data amount measurement mechanism (equivalent to the inter-processor traffic estimation mechanism in FIG. 1) as a mechanism for obtaining a total sum of the amount of transmission data in all the inter-process communication executed on a virtual machine 301 with reference to FIG. 4. The transmission data amount measurement mechanism includes a hook mechanism 305 for hooking an inter-process (303, 304) communication API 309 on the OS to cause an interruption to a hypervisor 300.

The hypervisor 300 includes an interruption processing unit 307 which executes processing in response to an interruption 310 and a transfer amount notification region 306 as a region for the hook mechanism 305 to write (311) the volume of data transmitted upon one API call. Further provided is an inter-process traffic counter 308 for obtaining a total sum of the amount of data transmission in inter-process communication. Since hook of the API might degrade system performance, the function is designed to have its operation/stop controlled from the side of the hypervisor 300.

Information about a total sum of memory access delays obtained by the foregoing mechanisms can be arbitrarily referred to from the reconfiguration determination unit 103 and the configuration decision unit 104. The reconfiguration determination unit 103 and the configuration decision unit 104 are further allowed to obtain a total sum of memory access delays as to an arbitrary configuration by receiving input of a configuration of assignment of an arbitrary physical resource 106 to the virtual machines 111 to 11n.

In addition, the OS of the present example has the function of changing affinity information without stopping operation. FIG. 9 shows a diagram of a configuration for changing affinity information without stopping operation of an OS 900. An affinity information obtaining unit 901 of the OS 900 poles affinity information of a system 904 and when its contents are changed, notifies a scheduler 902 and a memory management mechanism 903 on the OS. It is also possible for the hypervisor to cause an interruption to the OS 900 and notify the same of affinity information update. Upon receiving the contents, the process scheduler 902 and the memory management mechanism 903 change an assignment policy and then execute assignment from appropriate time.

Figure 5:
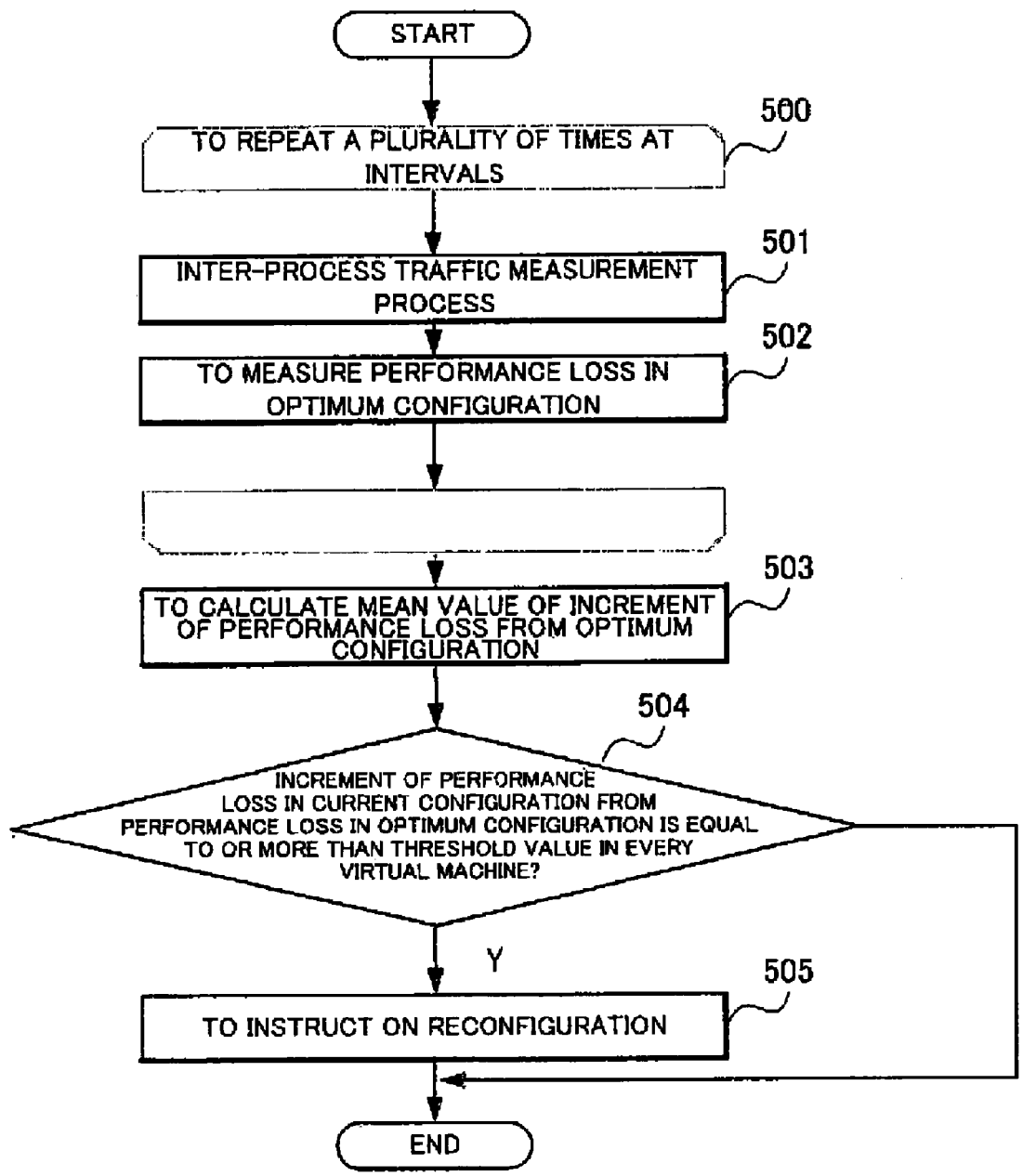
FIG. 5 is flow chart showing operation of a memory access delay estimation unit 102 in FIG. 1.

Next, a flow of operation of the present embodiment will be described with reference to the flow chart of FIG. 5. At certain intervals (at an interval of several-ten minutes) (500), the memory access delay estimation mechanism 102 in this example measures a total sum of memory access delays with respect to all the virtual machines (501). At the same time, with respect to each virtual machine, search an optimum physical resource assignment to a current virtual resource configuration (502) to obtain the amount of excess of a total sum of memory access delays in the current configuration from the optimum configuration.

Figure 6:
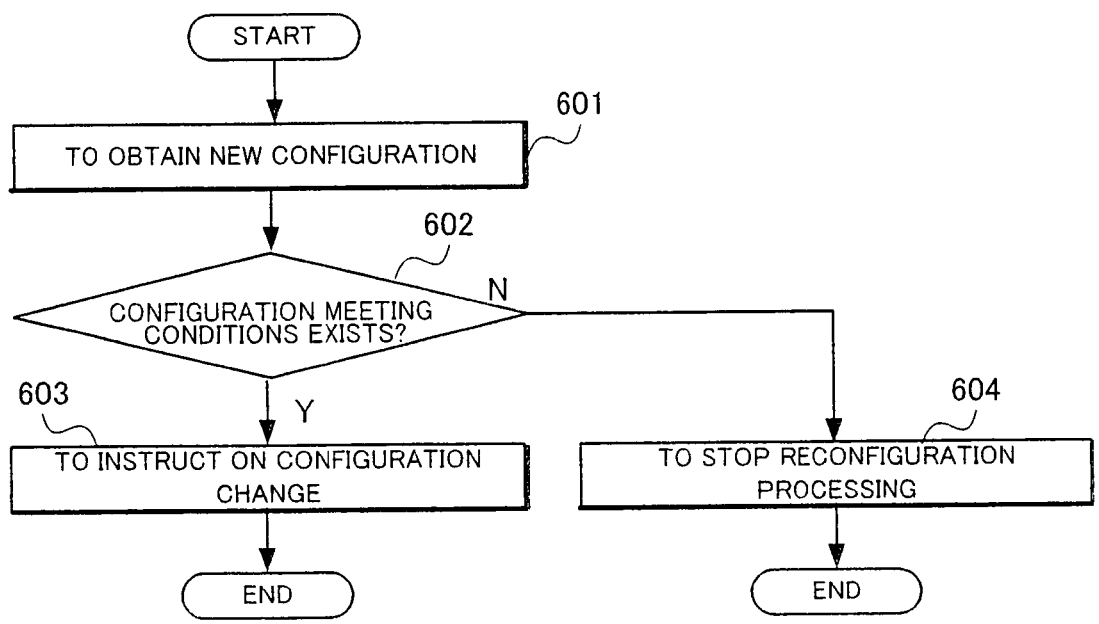
FIG. 6 is a flow chart showing operation of a configuration?) decision unit 104 in FIG. 1.

With respect to the obtained increment, the reconfiguration determination unit 103 averages data obtained by a plurality of times of measurement (503) and when the increment exceeds at least one of threshold values each set for each virtual machine (504), issues a reconfiguration instruction (505). For a virtual machine whose increment exceeds its threshold value, the configuration decision unit 104 obtains such physical resource assignment as prevents excess over the threshold value (601 in FIG. 6). At this time, while resources will be swapped with other virtual machine, the other virtual machine should be arranged to have a resultant total sum of memory access delays not exceeding the threshold value.

In principle, the configuration decision can be realized by obtaining a total sum of memory access delays with respect to all the combinations of virtual resources and physical resources and selecting an appropriate one of them. When such a combination fails to exist, refrain from executing reconfiguration (604). Although time required for this processing can be reduced by some methods of finding a combination, since they are known techniques, no detailed description will be made thereof.

The configuration change executing unit 105 changes the configuration such that physical resource assignment to a virtual machine has an obtained configuration. Since the changing method is a known technique, no detailed description will be made thereof. In outline, bring the OS on each virtual machine to a stopped state and after changing resource assignment, re-start the OS. Thereafter, when the number of CPU or the amount of memory on the virtual machine is changed, an appropriate interruption is made to the OS to notify that configuration is changed. In this example, neither the number of CPU nor the amount of memory changes due to a configuration change. Configuration change, however, causes a change of affinity information on the virtual machine. Therefore, the hypervisor 300 notifies an OS 302 of the change.

Next, operation of the memory access delay estimation mechanism 102 and the affinity information obtaining unit 101 will be detailed. Estimation of a total sum of memory access delays is made by using an estimation value of the amount of inter-processor communication data transmission. The memory access delay estimation mechanism 102 is allowed to obtain a total sum of memory access delays in each virtual machine by receiving the amount of data transmission in inter-processor communication from the inter-processor traffic estimation mechanism 131~13n assigned to each of the virtual machines and combining physical resource assignment to the virtual machine and affinity information. This enables a total sum of memory access delays to be obtained with respect to physical resource assignment to an arbitrary virtual machine. Use of a current configuration as the physical resource assignment to the virtual machine also enables a total sum of memory access delays in the current configuration to be estimated.

The affinity information obtaining unit 101 obtains and holds affinity information from a system (BIOS etc.) at the start of the hypervisor, whose information can be referred to by the memory access delay estimation mechanism 102 as required.

Next, a method of obtaining an estimation value of the amount of transmission of inter-processor communication data will be described. Since the amount of transmission of data communicated between virtual processors on a virtual machine can be estimated by measuring the amount of data transmission in inter-process communication as described above, description will be here made mainly of a method of measuring the amount of data transmission in inter-process communication.

Figure 7:
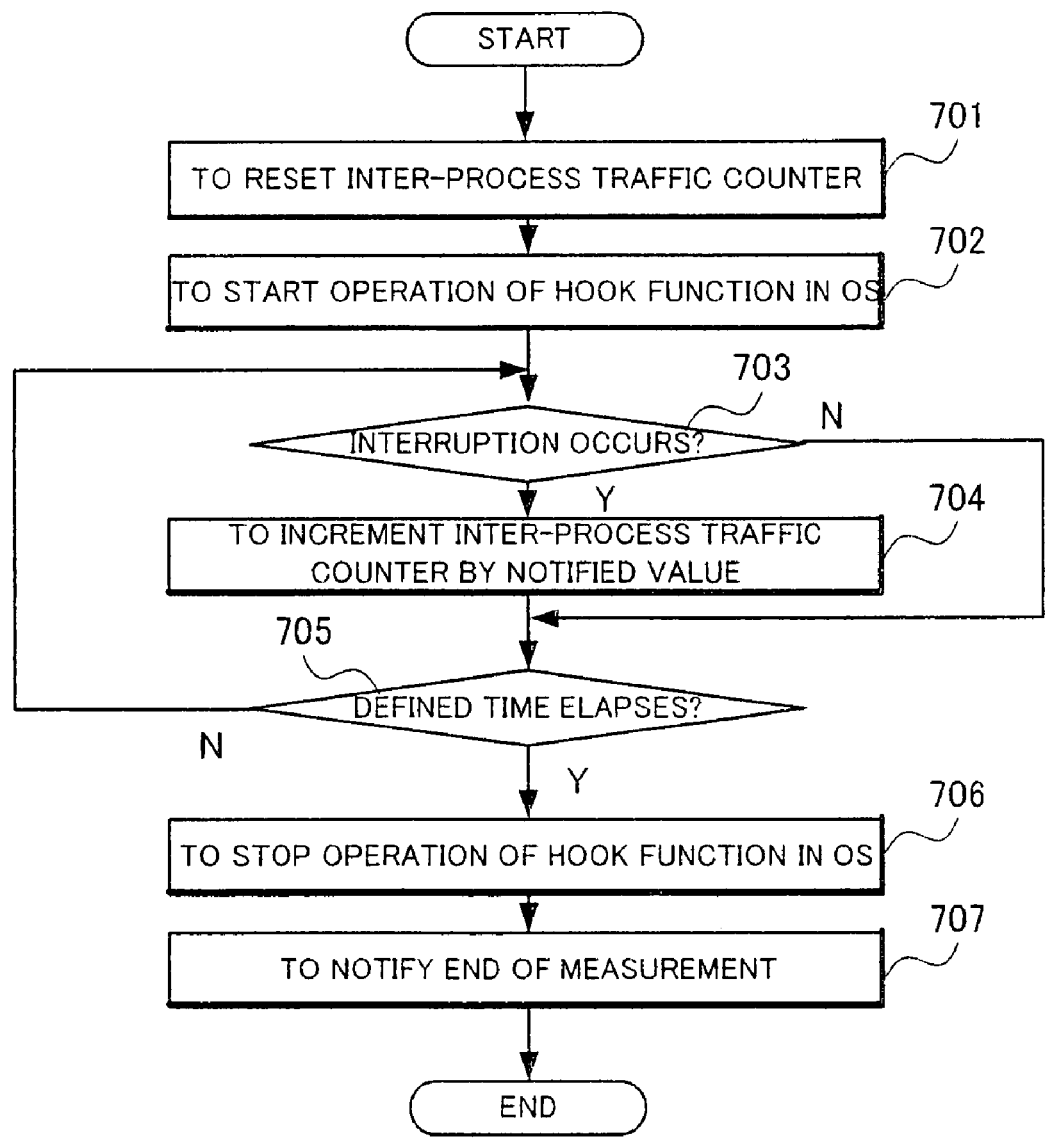
FIG. 7 is a flow chart showing operation executed on the side of a hypervisor in inter-process communication measurement.

First, FIG. 7 shows operation executed on the side of the hypervisor 300 in inter-process communication measurement. When the measurement starts, first the inter-process traffic counter 308 is reset (701). Next, start operation of the hook mechanism 305 on the OS (702) to cause an interruption to the hypervisor 300 every time the inter-process communication API is called up on the OS. When an interruption is caused (703), the interruption processing unit 307 on the hypervisor 300 is called up.

The interruption processing unit 307 refers to the transfer amount notification region 306 to increment the inter-process traffic counter 308 by a value written therein (704). This operation is repeated up to a set measurement time (assumed to be several seconds) and after a lapse of the measurement time, operation of the hook mechanism 305 on the OS is stopped (706) to end the measurement and notify the inter-processor traffic estimation mechanisms 131 to 13n of the completion of the measurement (707).

The inter-processor traffic estimation mechanisms 131 to 13n at this time points refer to the value of the inter-process traffic counter 308 to obtain the transmission amount of data communicated between two arbitrary processors on a virtual machine and notify the memory access delay estimation mechanism 102 of the obtained result.

Figure 8:
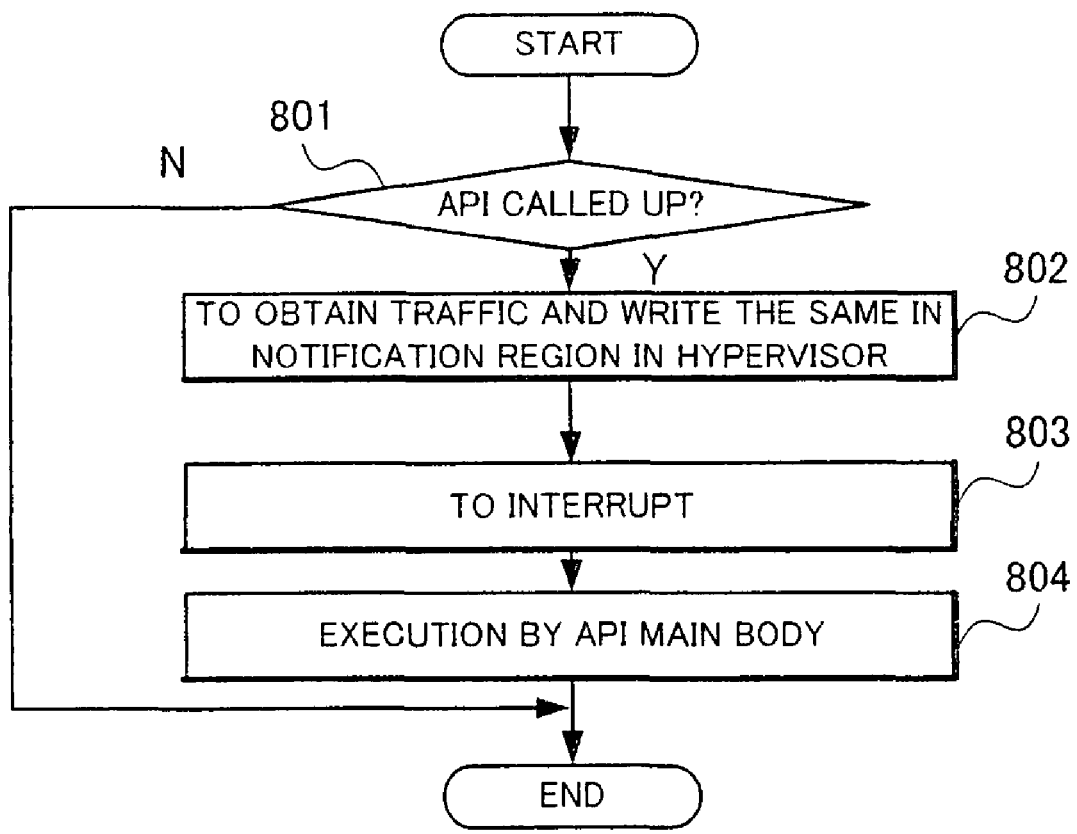
FIG. 8 is a flow chart showing operation of a hook mechanism on the side of an OS in inter-process communication measurement.

FIG. 8 shows operation of the hook mechanism 305 on the OS 302 in inter-process communication measurement. The hook mechanism 305, when its operation is validated, executes processing every time the inter-process communication API is called up by a process (801). First, obtain the traffic from the called up API 309 (802) and write the obtained value into the transfer amount notification region 306 in the hypervisor 300 to interrupt the hypervisor 300 (803). Thereafter, shift the processing to the API 309 to execute the processing (804). At this time, there is no need of waiting for completion of the interruption processing on the side of the hypervisor 300.

When measurement of a total amount of data transmission by inter-process communication is completed, obtain a total sum of memory access delays on the virtual machine 301 from the measurement value. Its method is as described above.

It is apparent that each operation of the above-described embodiment can be executed by reading its operation procedure stored as a program in a recording medium such as a ROM by a computer and executing the same by the computer.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A virtual computer system in which with memory access times within a node and between nodes differing from each other, a hypervisor controls a virtual processor which executes a process on a plurality of nodes, comprising:

said hypervisor executed by a processor including
a unit which obtains a total sum of memory access delay time on a virtual machine based on affinity information indicative of a latency or a band of communication between said virtual processors and an estimation value of the amount of transaction between two arbitrary virtual processors in the virtual machine which is estimated from inter-processor traffic estimated from a measurement value of a total sum of the volume of data transmitted in all the inter-process communication executed on a virtual machine and the number of virtual processors, and
a unit which reconfigures a physical resource based on said total sum of delay time.

2. The virtual computer system according to claim 1, wherein
said unit which obtains a total sum of delay time includes
a unit which obtains said affinity information,
a unit which obtains said estimation value of the amount of transaction, and
a unit which calculates said total sum of delay time from a product of said affinity information and said estimation value of the amount of transaction.

3. The virtual computer system according to claim 2, wherein
said unit which obtains the affinity information polls said affinity information with respect to said physical resource to update said affinity information when the contents of said affinity information are changed.

4. The virtual computer system according to claim 1, wherein
said unit which reconfigures a physical resource includes
a unit which determines whether to reconfigure said physical resource or not according to said total sum of delay time, and
a unit which assigns a physical resource according to a predetermined policy when the determination is made that reconfiguration is to be executed.

5. The virtual computer system according to claim 1, wherein
said unit which obtains a total sum of delay time includes
a unit which obtains said affinity information,
a unit which obtains said estimation value of the amount of transaction, and
a unit which calculates said total sum of delay time from a product of said affinity information and said estimation value of the amount of transaction, and
said unit which reconfigures a physical resource includes
a unit which determines whether to reconfigure said physical resource or not according to said total sum of delay time, and
a unit which assigns a physical resource according to a predetermined policy when the determination is made that reconfiguration is to be executed.

6. A resource reconfiguration method in a virtual computer system in which with memory access times within a node and between nodes differing from each other, a hypervisor controls a virtual processor which executes a process on a plurality of nodes, comprising the steps of:

obtaining a total sum of memory access delay time on said virtual machine based on affinity information indicative of a latency or a band of communication between said virtual processors and an estimation value of the amount of transaction between two arbitrary virtual processors in the virtual machine which is estimated from inter-processor traffic estimated from a measurement value of a total sum of the volume of data transmitted in all the inter-process communication executed on a virtual machine and the number of virtual processors, and reconfiguring a physical resource based on said total sum of delay time.

7. The resource reconfiguration method according to claim 6, wherein said step of obtaining a total sum of delay time includes the step of obtaining said affinity information, the step of obtaining said estimation value of the amount of transaction, and the step of calculating said total sum of delay time from a product of said affinity information and said estimation value of the amount of transaction.

8. The resource reconfiguration method according to claim 7, wherein at said step of obtaining the affinity information, said affinity information is updated when the contents of said affinity information are changed by polling said affinity information with respect to said physical resource.

9. The resource reconfiguration method according to claim 6, wherein said step of reconfiguring a physical resource includes the step of determining whether to reconfigure said physical resource or not according to said total sum of delay time, and the step of assigning a physical resource according to a predetermined policy when the determination is made that reconfiguration is to be executed.

10. The resource reconfiguration method according to claim 6, wherein said step of obtaining a total sum of delay time includes the step of obtaining said affinity information, the step of obtaining said estimation value of the amount of transaction, and the step of calculating said total sum of delay time from a product of said affinity information and said estimation value of the amount of transaction, and said step of reconfiguring a physical resource includes the step of determining whether to reconfigure said physical resource or not according to said total sum of delay time, and the step of assigning a physical resource according to a predetermined policy when the determination is made that reconfiguration is to be executed.

11. A computer program stored on a computer readable recording medium for causing a computer to execute a resource reconfiguration method in a virtual computer system in which with memory access times within a node and between nodes differing from each other, a hypervisor controls a virtual processor which executes a process on a plurality of nodes, comprising the functions of:

a function of obtaining a total sum of memory access delay time on a virtual machine based on affinity information indicative of a latency or a band of communication between said virtual processors and an estimation value of the amount of transaction between two arbitrary virtual processors in the virtual machine which is estimated from inter-processor traffic estimated from a measurement value of a total sum of the volume of data transmitted in all the inter-process communication executed on a virtual machine and the number of virtual processors, and a function of reconfiguring a physical resource based on said total sum of delay time.

* * * * *